T. B. PRITCHARD.
RAIN SHIELD FOR AUTOMOBILES.
APPLICATION FILED JAN. 8, 1917.
1,260,577. Patented Mar. 26, 1918.
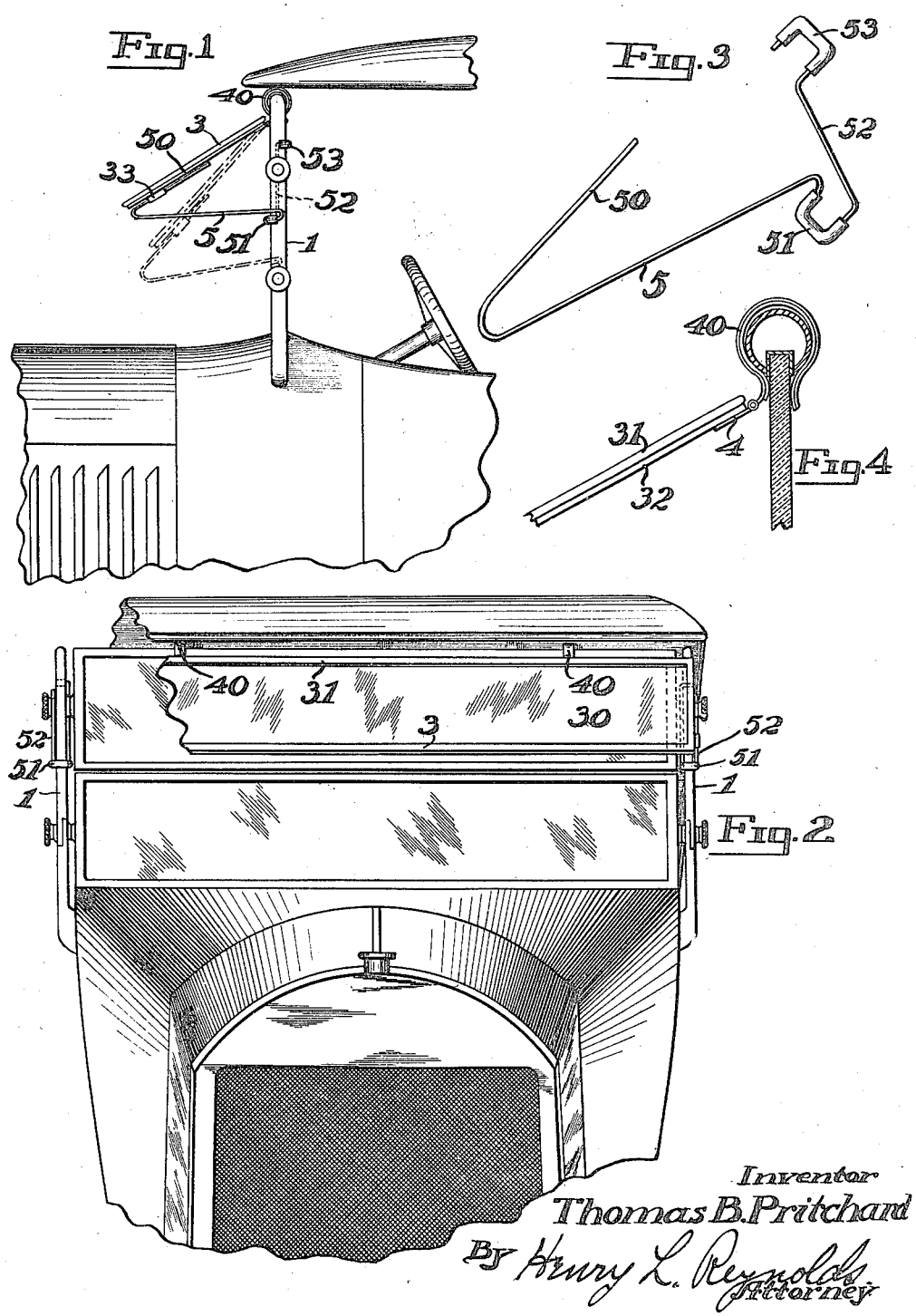

UNITED STATES PATENT OFFICE.

THOMAS B. PRITCHARD, OF SEATTLE, WASHINGTON.

RAIN-SHIELD FOR AUTOMOBILES.

1,260,577. Specification of Letters Patent. Patented Mar. 26, 1918.

Application filed January 8, 1917. Serial No. 141,078.

*To all whom it may concern:*

Be it known that I, THOMAS B. PRITCHARD, a citizen of the United States, and resident of the city of Seattle, county of King, and State of Washington, have invented certain new and useful Improvements in Rain-Shields for Automobiles, of which the following is a specification.

My invention relates to rain shields for the wind shields of automobiles, or devices designed to protect the wind shield of automobiles in such manner as to keep the rain therefrom when driving, so that the vision through the wind shield will not be interfered with.

The object of my invention is to provide a device for securing the above results, which device shall be attachable and detachable so that it may be placed upon any of the usual makes of automobiles and may be removed when its presence is not desired.

The particular features of novelty in my invention will be hereinafter described and then particularly pointed out in the claims.

In the accompanying drawings I have shown my device in the form of construction which I now prefer.

Figure 1 is a side view of a portion of an automobile showing the wind shield and my device applied thereto.

Fig. 2 is a front view of a portion of an automobile showing my device in position thereto.

Fig. 3 is a perspective view of one of the arms by which the ends of the shield are supported.

Fig. 4 is a cross section through the upper portion of a wind shield with my device secured thereon.

In driving automobiles in rainy weather the rain on the front or outer face of the wind shield obscures vision through this to such an extent as to often cause trouble. In my present invention I have produced a device which is designed to be attached to and detached from a wind shield as it may be needed and which protects the outer surface of the wind shield from the rain so that at all times there will be a zone of clear vision unaffected by the rain. The general construction of wind shields of automobiles follows certain standard lines. The construction of my device is such that, without modification, except as to size of parts and this only to a limited extent, it may be applied to or removed from, any of the standard makes of automobiles.

In the drawings, 1 represents the side post of the frame upon which the wind shield is mounted. 2 represents the upper section of the wind shield, which is generally mounted so that it may be turned upon pivots, as 20, to thereby assume different angles.

The rain shield consists of a frame 3 having therein a sheet 30, of transparent material. Preferably this sheet should be of thin celluloid, as this is not as liable to breakage as would be glass, and, in addition, is of much lighter weight. This frame may be of any suitable type of construction. The construction shown consists of bars 31 preferably of aluminum on account of its lightness, which are combined with bars 32 of wood, between which the edges of the sheet of celluloid are secured. The construction of this frame may, however, be made of any type of construction which is found suitable. Preferably, this should be such as to secure lightness together with sufficient strength.

Along one of the long edges of the frame are secured two or more clamping devices by which it may be secured to the upper horizontal bar of the upper section of the wind shield. These are hinged members and consist of a plate 4 which is secured to the frame of the rain shield, and a spring bar 40 hinged thereto and shaped so that it may be sprung over the top bar of the wind shield and be securely held thereon against removal. These clips 40 may, to a certain extent, be placed upon the wind shield frame and removed therefrom by sliding, if this is desired. They should embrace the upper bar of the wind shield so as to hold the rain shield securely against removal by the action of the wind thereon when the automobile is in motion.

In use, the rain shield is supported at a projecting angle, which angle may vary with circumstances. Two positions have been shown in Fig. 1, one by full lines, the other by dotted lines. The means for supporting this rain shield may vary. The means now preferred by me are as follows. At each end of the wind shield is employed a support consisting of a stout wire, or rod, which is bent so as to form an outwardly extending straight section 5, an end section 50, which is bent backward and upward at an angle corresponding approximately with the angle assumed by the rain shield, and the other end of each rod is bent in such manner as to engage securely with the side post 1 of the wind shield supporting frame. The outer or forward section 50 enters a slide within a guide or socket 33, carried by the end of the rain shield. When in use there will be a strain upon the supporting arm sufficient to prevent sliding within the socket 33 and yet such sliding may be secured when desired, by applying a little force to the bar.

The supporting arms 5 have a loop 51 formed therein, which loop is of such size and shape as to fit snugly about and embrace the forward side of the post 1. The rod within extends upwardly alongside of the post, as a section 52, at the upper end of which is a loop 53, formed therein, which engages and embraces the rear side of the post 1. The strain on the bar 5 is downwardly and the relative position of the two straight sections 5 and 52, when not under strain, is such that they make an acute angle with each other. When applied to the post 1, this produces a tension in such direction as securely holds it in place thereon. By shifting the position of the supporting bars vertically upon the post 1 and also by shifting the outer end section 50, relative to the clip or guide 33, the position of the rain shield may be varied, as has been indicated by the two positions shown in Fig. 1, respectively, by the solid and by the broken lines.

In using this device the operator has a narrow strip of the upper section of the wind shield, consisting of the portion which lies below the line of vision which is tangent to the lower edge of the rain shield, which is protected by the rain shield against accumulation of rain thereon and consequently the vision through this section of the wind shield is not obscured by the rain. This is sufficient to answer for all purposes. At the same time the vision of the driver through the other portions of the wind shield and also through the body of the rain shield, is not affected except by the rain thereon. While this portion of the shield may be obscured by the rain there is always a horizontal strip which is not affected by the rain. In consequence, the driver never has his vision obscured entirely, but can obtain a clear view of what lies ahead of his machine. Tests of this device have shown it to work well under rainy conditions and at all speeds at which it is safe to drive an automobile.

What I claim as my invention is:

1. A rain shield for automobile wind shields comprising a protective plate, means for detachably hinging said plate to the upper part of the wind shield, a plate supporting brace adapted by its rear end to be detachably secured to the wind shield frame and to be vertically adjustable thereon, the forward end of said brace arm having an extension which is bent backward and up, and means carried by said plate for supportingly engaging said end section.

2. A rain shield for automobile wind shields comprising a protective plate, means for hingedly securing said plate to the upper part of the wind shield, a brace carrying a forwardly-projecting arm adapted to be detachably secured to the wind shield frame, and slidable thereon, the outer end section of said brace arm being bent backward and up, said plate having a socket adjacent an edge and adapted to receive the upwardly bent end section, the latter being adjustable lengthwise therein.

3. A rain shield for automobile wind shields comprising a protective plate, means for hingedly securing said plate to the upper edge of the wind shield, a brace adapted to be detachably secured to the wind shield frame, said brace comprising a forwardly projecting arm, an end section bent upward and back from the forward end thereof, and a securing section bent to form clips embracting opposite sides of the wind shield frame, and means for supporting said plate upon the upwardly bent end section.

4. A rain shield for automobile wind shields comprising a protective plate, means for hingedly securing said plate to the upper edge of the wind shield, a resilient brace rod adapted to be detachably secured to the wind shield frame, said brace comprising a forwardly projecting arm, an end section bent upward and back from the forward end thereof, a clip bent in the brace rod at the rear end of said arm and adapted to embrace the forward edge of the wind shield frame, and a second clip bent in the end of the brace rod and adapted to embrace the rear edge of the wind shield frame above the first clip, and means for supporting said plate upon the upwardly bent end section.

Signed at Seattle, Washington, this 3 day of January, 1917.

THOMAS B. PRITCHARD.